United States Patent [19]

Horne

[11] 4,450,479
[45] May 22, 1984

[54] THERMAL IMAGING APPARATUS
[75] Inventor: David R. Horne, Crowborough, England
[73] Assignee: U.S. Philips Corporation, New York, N.Y.
[21] Appl. No.: 368,782
[22] Filed: Apr. 15, 1982
[30] Foreign Application Priority Data Apr. 29, 1981 [GB] United Kingdom ................. 8113286

[51] Int. Cl.³ .............................................. H04N 7/18
[52] U.S. Cl. ..................................... 358/113; 250/332; 250/334
[58] Field of Search ................. 358/113; 250/332, 334
[56] References Cited

U.S. PATENT DOCUMENTS

| | | | |
|---|---|---|---|
| 3,626,091 | 12/1971 | Casper | 358/113 |
| 4,222,065 | 9/1980 | Pusch | 358/113 |
| 4,264,929 | 4/1981 | Pusch | 358/113 |
| 4,300,160 | 11/1981 | Pusch | 358/113 |
| 4,338,627 | 7/1982 | Stapleton | 358/113 |

Primary Examiner—Howard W. Britton
Attorney, Agent, or Firm—Marc D. Schechter

[57] ABSTRACT

The "narcissus" effect in a thermal imaging apparatus employing scanned arrays of cooled infrared radiation detectors is produced, in part, by the detectors seeing themselves by reflection in the surfaces of the optical elements during the middle part of the scan. The narcissus effect results in a darkened center in the displayed picture. To compensate for this effect, a signal is formed of the sum of the detector outputs. This signal is applied in negative feedback to each detector output. Extended bright or dark areas are suppressed but picture detail special to individual detectors is largely unaffected.

6 Claims, 2 Drawing Figures

THERMAL IMAGING APPARATUS

BACKGROUND OF THE INVENTION

This invention relates to imaging apparatus in which an image of a scene is formed from nonvisible radiation from the scene, and in which a radiation detector is scanned across the image. A visible version of the scene is reconstructed by a corresponding scan of a light source modulated by the detector output. More particularly, the invention relates to thermal imaging apparatus in which the nonvisible radiation is the natural thermal infrared radiation emitted by objects in the scene by reason of their temperatures and emissivities.

A thermal imaging apparatus is disclosed in U.S. Pat. No. 3,626,091. The apparatus comprises a linear array of infrared detectors and a corresponding linear array of light sources. Each light source is modulated by a corresponding detector output. The detectors and light sources are synchronously scanned in a plurality of bands of lines across the scene by a rotating mirror prism having planar mirrors set at various angles around the axis of rotation. The mirror prism has twice as many mirror faces as there are bands scanned in the scene. Scanning of the detectors is carried out by one set of mirrors while reconstruction (scanning of the light sources) is carried out by a second set of mirrors. British Pat. No. 2,087,189A describes thermal imaging apparatus of this type in which a mirror prism is used, and in which all but one of the planar mirrors take part in both scanning and reconstruction.

In thermal imaging apparatus of this type, the detectors, commonly photoconductive indium antimonide or cadmium mercury telluride, are usually cooled and usually have a cold shield to limit their field of view. Liquid nitrogen, solid carbon dioxide or thermoelectric cooling means may be employed. In consequence, the radiation emitted by the detectors themselves, by the substrate upon which they are mounted and by the cold shield will be generally less than that emitted by adjacent uncooled parts of the inside of the apparatus.

An objective lens is used to form an infrared image of the scene upon the detectors. Typically, this objective will be stationary relative to the detectors, and the planar scanning mirrors are beyond the objective.

An afocal telescope may be placed beyond the scanning mirrors to provide telefoto or wide-angle viewing. Typically an afocal refracting telescope may be used comprising germanium and silicon elements, as described and claimed in British Pat. No. 1,530,066. The optical elements of this telescope frequently comprise surfaces concave toward the detectors. Germanium and silicon are of relatively high refractive index (3.4. and 4.0 respectively), and the amplitude of thermal radiation reflected by such surfaces is not negligible, even when these surfaces have been coated to minimize such reflection.

Consequently, during a part of the scan, usually the center, the detectors receive radiation emitted by themselves, the substrate, and the cold shield, which radiation has been reflected by at least one surface of the objective lens or, via the scanning mirror, by at least one surface of the telescope elements. This reflected radiation is reduced in amount compared to that which the detectors receive during the remainder of the scan from adjacent uncooled parts of the inside of the apparatus. In consequence, the general level of the detectors' outputs falls during the center part of the scan, darkening the general level of picture detail and creating the appearance of a dark patch in the center of the picture. To those skilled in the art, this is known as the "narcissus" effect, referring to the fact that it is due to the cooled detectors "seeing" themselves by reflection.

Also, if the thermal imager is being used to view a generally cold scene, a considerable drop in detector output occurs as the scanning mirror passes from the inside of the equipment onto the scene.

Relatively large changes in brightness can occur across naturally occurring thermal scenes, making it difficult to display in one picture details of dark parts and high lights simultaneously. Flattening the general level of brightness across the visible scene may be of advantage in some applications of thermal imaging.

SUMMARY OF THE INVENTION

It is an object of the invention to provide a thermal imaging apparatus in which the narcissus effect is suppressed. To this end the invention provides a thermal imaging apparatus for producing a visible version of a scene represented by thermal infrared radiation. The apparatus comprises an objective lens arranged to form an infrared image of the scene upon an array of infrared radiation detectors. It further comprises means for scanning the image transverse to the array, display means for reconstructing a visible version of the scene from the electrical output signals of the detectors, a summing device for forming an output signal derived from the sum of all detector output signals, and means for adding the output signal in negative feedback to each of the detector outputs.

Another object of the invention is to increase the dynamic range of thermal signals which can be displayed and also to produce a picture of more even appearance.

A common method of displaying the reconstructed version of the visible scene is by using the scanning mirrors to scan light sources modulated by corresponding detectors. To achieve this, the invention may also provide thermal imaging apparatus wherein the scanning means comprises a mirror prism which is rotatable about an axis and which includes a plurality of planar mirrors which form an equiangular polygon in a cross-section normal to the axis. The planar mirrors rotate through a sequence of various tilt angles with the axis so that the scene is scanned two-dimensionally as the mirror prism is rotated about the axis. The objective lens is arranged to receive infrared radiation from the scene via the planar mirrors as they pass through a scanning location. The lens then forms an image of the scene which, in response to prism rotation, moves transversely across a linear array of infrared radiation detectors.

The display means comprises a linear array of light sources, each coupled to a corresponding detector in the detector array. Each light source is adapted to produce a light beam modulated in response to the electrical outputs. These light beams are directed at the planar mirrors at a reconstruction location. Viewing means is arranged to receive the modulated light beams reflected by the planar mirrors for reconstructing the visible version of the scene in bands of lines. Each band is generated by the array. The light sources may comprise light emitting diodes, and the current in these diodes may be supplied through a common load impedance.

The sum signal is derived from the voltage generated across this impedance.

The benefit of the invention will be obtained generally when the picture detail shows a steady periodic type of temperature variation across the frame, when the lines of the band differ from one another and when there are a relatively large number of detectors in the array so that the sum signal contains little of the detail of any one line and represents an average of scene brightness variation across the picture. In this event, the sum signal applied in the negative feedback will operate to suppress low frequency temperature contours in the scene and low frequency signals derived from the contrast between the interior equipment and the scene. The invention may also provide thermal imaging apparatus in which a low-pass filter is connected in series between the summing device and the adding means, whereby relatively high frequency picture detail is substantially not reduced by the negative feedback.

DESCRIPTION OF THE PREFERRED EMBODIMENTS

Figure 1:
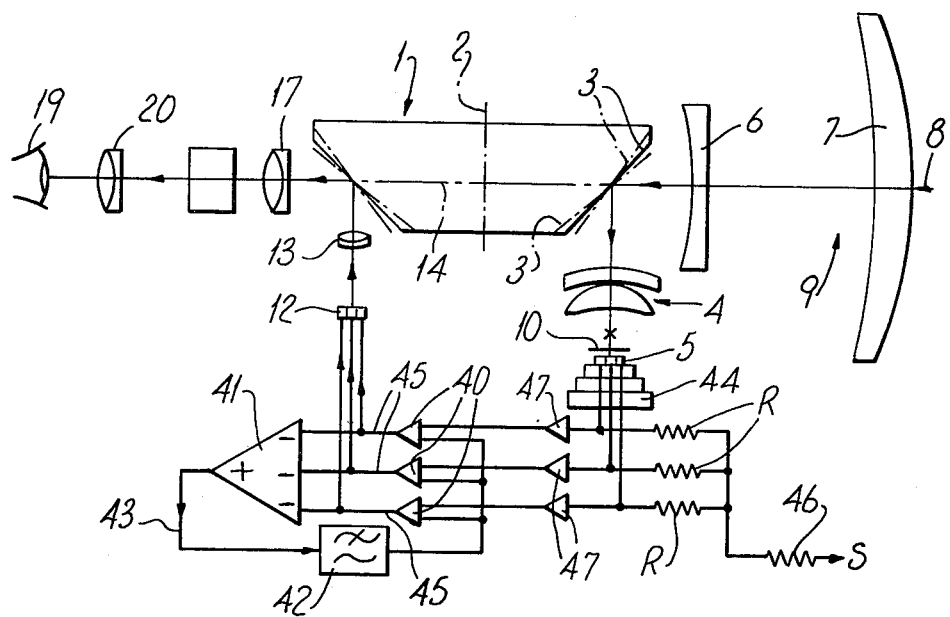
FIGS. 1 and 2 show schematic elevation and plan views, respectively, of a thermal imaging apparatus employing modulated light sources for picture reconstruction and display.
Figure 2:
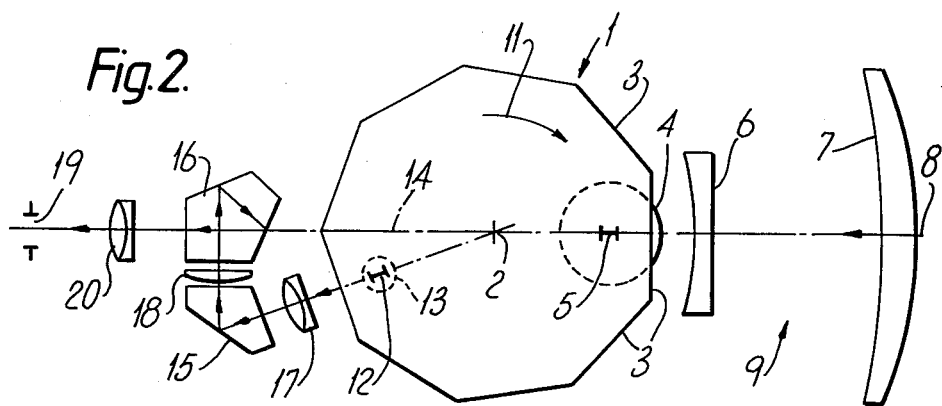

In FIGS. 1 and 2 the chief ray 8 of a beam of infrared radiation is shown entering the apparatus from a point in the scene in the center of the field of view. An afocal Galilean telescope 9 may be employed to provide scene magnification by a factor of between 2 and 3. The telescope comprises a positive silicon lens 7 and a negative germanium lens 6 as described in British Pat. No. 1,530,066.

After exiting the telescope 9, the beam of infrared radiation is reflected by a planar mirror 3 of a rotatable mirror prism 1. The reflected radiation beam is substantially parallel to the axis of rotation 2 of the mirror prism. An objective lens 4 at the scanning location forms an image 10 of the scene in the plane of a linear array of infrared detectors 5 aligned along a radius extending from the axis of rotation 2. The detectors 5 are mounted on a 3-stage thermoelectric cooler 44.

Rotation of the prism about axis 2 (e.g. in the direction of arrow 11 in FIG. 2) causes the image 10 to be moved transversely across the length of the linear array 5, scanning a band of lines in the image 10. The rotational motion of mirror 3 also causes rotation of the image 10 on its own plane by an angle equal to the scan angle. Over the limited angle of rotation effectively used by mirror 3 for scanning, the scene distortion produced is relatively minor and is largely compensated by a corresponding rotation produced by image reconstruction using another mirror 3.

The mirror prism 1 has nine planar mirrors 3 set at equal angles about the axis 2 so that any cross-section of the prism normal to axis 2 is shaped as an equiangular polygon. In particular, the section through the centers of mirrors 3 results in the regular polygon of FIG. 2. The mirrors 3 are generally set at an angle of 45 degrees to axis 2, though each mirror 3 has a small additional angle of tilt away from 45 degrees, different for each mirror 3. The difference in tilt angle between any two mirrors 3 is an integral multiple of half the angular length of the linear array 5 given by dividing the linear length of the array by the focal length of the objective lens 4. Thus, between the scans produced by two mirrors 3 having a tilt difference equal to half of the angular length, the image 10 is shifted along the array 5 by the length of the array so that the bands in the image 10 scanned by these two mirrors are contiguous. In an example where the angular length of the array is 2 degrees, the sequence of mirror angles is given by the following table.

| Mirror No. | Mirror Angle |
|---|---|
| 1 | 41°30' |
| 2 | 43°30' |
| 3 | 45°30' |
| 4 | 47°30' |
| 5 | 49°30' |
| 6 | 42°30' |
| 7 | 44°30' |
| 8 | 46°30' |
| 9 | 48°30' |

Thus, in one complete rotation of the prism, nine contiguous bands are scanned in two interlaced groups of bands, the odd numbered bands being scanned first, followed by the even numbered bands. This sequence also provides a prism which is more nearly dynamically balanced. Also, since successively scanned bands are separated by gaps and may be of markedly different average brightness, the scene brightness in one band may be shifted in brightness relative to a contiguous band due to a.c. coupled amplifiers, giving the overall picture a banded appearance. The negative feedback operates to reduce banding from this origin.

To reconstruct a visible version of the scene, a linear array of light sources 12, aligned along a radius extending from the axis of rotation 2, is provided at a reconstruction location. Each light source 12 is coupled by an amplifier 40 to a corresponding detector in the detector array 5. For simplicity, in FIG. 1 only three detectors, amplifiers and sources are shown. Each light source 12 produces a light output modulated in response to the radiation received by the corresponding detector. Lens 13 collimates light beams from the sources substantially parallel to axis 2 and directs them onto the face of a mirror 3. Lens 13 also presents the array 12 to the viewing optics at an angular length equal to that of the array 5 so that the reconstructed visible bands are contiguous.

Since the normals to adjacent faces of the nine sided polygon are inclined at 40° to one another, the reconstruction location is off-set in angle from the apparatus axis 14 by an angle of 20 degrees. As one mirror 3 passes through the scanning location another mirror 3 passes through the reconstruction location synchronously. To realign the viewing line of sight along the axis 14, a pair of prisms 15 and 16 are used. These prism, by providing three reflections of the visible image in the horizontal plane, reverse the visible picture from left to right. The sequence of mirror tilt angles given in the above table results in the reconstructed picture being reversed top to bottom. Consequently there is one complete inversion of the visible image due to these two effects.

The ideal position for the pupil of the observer's eye, in order to avoid vignetting, would be at the surface of mirror 3 at the scanning location. Lenses 17 and 18 image the scanning location onto the apparatus exit pupil 19, for practical viewing, and produce another inversion of the image so that the reconstructed scene is viewed erect. Eyepiece lens 20 restores the overall magnification to unity and provides eye diopter adjustment.

Lens elements 6 and 7 of the telescope 9 have plane or concave surfaces toward mirrors 3 and detectors 5. The motion of mirrors 3 effectively swing the axis of telescope 9 through the axis of objective 4. As these two axes pass through, or close to, alignment the detectors will be exposed to reflected out-of-focus radiation from the cooled detector substrate of thermoelectric cooler 44 rather than to radiation from ambient temperature objects (not shown) to either side of the cooler 44. Thus, the general level of radiation at the detectors will fall, producing the "narcissus" effect in the reconstructed image. As the axis swings to the side of the field of view, the general level of radiation at the detectors will rise if the scene is cooler than the equipment due to out-of-focus reflections from telescope clamp rings and internal imager components. This will add to the "narcissus" effect and may even be the largest factor affecting image quality.

Referring to FIG. 1 the outputs 45 of the three adding amplifiers 40 are connected to the three inputs of a summing device comprising an inverting adder 41. The scaled output 43 of inverting adder 41 is connected, optionally via a low-pass filter 42, to a second input of each of the adding amplifiers 40. The detectors may, for example, be photoconductive cells, each fed with a steady bias current from the common bias supply S via an individual load resistor R. The variations in infrared radiation falling on each detector produce variations in its resistance and hence in its bias current. The output signal is taken across each detector and fed via a preamplifier 47 to the first inputs of amplifiers 40. Between the detectors and the light sources, the amplifiers are a.c. coupled. The sign of the feedback connection is such that a general fall in the outputs 45, consequent, say, upon "narcissus" effect occurring, will produce a rise in output 43 and hence a rise in the second inputs of amplifiers 40, tending to reverse the fall in outputs 45.

The effect of the invention is also to increase the dynamic range of brightness which can be displayed and to produce a picture of a more even appearance. Infrared scenes frequently contain detail superimposed on both extended cold areas and extended hot areas. The invention assists in displaying both sets of detail in one picture. Also, in battery powered equipment, the current consumed by the light sources 12, which are typically light-emitting diodes may be an appreciable fraction of the total current. Without the invention, excessive current may be carried by the diodes in extended light areas. Thus, the invention is of value in reducing battery drain.

I claim:

1. Thermal imaging apparatus for producing a visible version of a scene represented by thermal infrared radiation, said apparatus comprising an objective lens arranged to form an infrared image of said scene upon an array of infrared radiation detectors, means for scanning said image transversely relative to said array, display means for reconstructing a visible version of said scene from the electrical output signals of the detectors, a summing device for forming an output signal derived from the sum of all detector output signals, and means for adding the output signal in negative feedback to each of the detector outputs.

2. Thermal imaging apparatus as claimed in claim 1, wherein a low pass filter is connected in series between said summing device and said adding means, whereby relatively high frequency picture detail is substantially not reduced by said negative feedback.

3. Thermal imaging apparatus as claimed in claim 2, wherein said array is mounted upon a cooled substrate, and wherein said objective lens comprises a partly reflecting surface such that, over a part of the scan, said array can receive reflected radiation from said substrate which is reduced in amount compared to the radiation reflected from adjacent uncooled parts of the apparatus in the remainder of the scan.

4. Thermal imaging apparatus as claimed in claim 3, wherein said scanning means comprise a mirror prism which is rotatable about an axis and which includes a plurality of planar mirrors which form an equiangular polygon in a cross section normal to said axis and which make a sequence of various tilt angles with said axis so that said scene is scanned two-dimensionally as the mirror prism is rotated about said axis, the objective lens being arranged to receive infrared radiation from said scene via said planar mirrors as they pass through a scanning location and to form an image of said scene which, in response to prism rotation, moves transversely across a linear array of infrared radiation detectors, and wherein said display means comprise a linear array of light sources coupled one each to a corresponding detector in said detector array and each light source being adapted to produce a light beam modulated in response to said electrical outputs, the light beams being directed at said planar mirrors at a reconstruction location and viewing means arranged to receive the modulated light beams reflected by said planar mirrors for reconstructing said visible version of said scene in bands of lines, each band being generated by said array.

5. Thermal imaging apparatus as claimed in claim 4, wherein said light sources comprise light emitting diodes, and wherein the current in said diodes is supplied through a common load impedance, said sum signal being derived from the voltage generated across said impedance.

6. A thermal imaging device for receiving a thermal, infrared radiation image of a scene and converting it into a visible image, said device comprising:
   an array of infrared radiation detectors, said detectors generating electrical output signals in response to incident infrared radiation;
   means for forming an infrared image of the scene upon the detector array;
   means for scanning the infrared image across the array;
   display means for reconstructing a visible image of the scene from the electrical output signals of the detectors;
   summing means for adding electrical signals applied to a plurality of inputs, said summing means producing an electrical output signal which is proportional to the total of the electrical signals applied to all of the inputs; and
   means for modifying each detector output by subtracting the output signal of the summing means from each detector output, said modified detector outputs being the inputs to the summing means.

* * * * *